(12) United States Patent
Park et al.

(10) Patent No.: US 11,381,094 B2
(45) Date of Patent: Jul. 5, 2022

(54) BATTERY CONTROL APPARATUS AND ENERGY STORAGE SYSTEM INCLUDING SAME

(71) Applicant: LG CHEM, LTD., Seoul (KR)

(72) Inventors: Mi-So Park, Daejeon (KR); Chang Ha Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 211 days.

(21) Appl. No.: 16/651,798

(22) PCT Filed: Feb. 13, 2019

(86) PCT No.: PCT/KR2019/001776
§ 371 (c)(1),
(2) Date: Mar. 27, 2020

(87) PCT Pub. No.: WO2019/216532
PCT Pub. Date: Nov. 14, 2019

(65) Prior Publication Data
US 2020/0244075 A1 Jul. 30, 2020

(30) Foreign Application Priority Data

May 9, 2018 (KR) .......................... 10-2018-0053253

(51) Int. Cl.
*H02J 7/00* (2006.01)
*H01M 10/44* (2006.01)

(52) U.S. Cl.
CPC .......... *H02J 7/0029* (2013.01); *H02J 7/0048* (2020.01); *H02J 7/007182* (2020.01);
(Continued)

(58) Field of Classification Search
CPC ...... H02J 7/0013; H02J 7/0029; H02J 7/0048; H02J 7/007182; H02J 7/0014;
(Continued)

(56) References Cited

U.S. PATENT DOCUMENTS 5,952,813 A * 9/1999 Ochiai ...................... H02J 7/02
320/104
6,704,596 B2 * 3/2004 Digby .................... A61N 1/378
607/2
(Continued)

FOREIGN PATENT DOCUMENTS

CN 107769279 A 3/2018
CN 108081994 A * 5/2018
(Continued)

OTHER PUBLICATIONS

Extended European Search Report dated Oct. 13, 2020, issued in corresponding European Patent Application No. 19800303.0.
(Continued)

*Primary Examiner* — John T Trischler
(74) *Attorney, Agent, or Firm* — Morgan, Lewis & Bockius LLP

(57) ABSTRACT

A battery control apparatus, a battery control method and an energy storage system including the battery control apparatus are disclosed. The disclosed battery control apparatus includes a first battery pack, a second battery pack, a first switch connected in series to the first battery pack between the first terminal and the second terminal, a second switch connected in series to the second battery pack between the first terminal and the second terminal, and a control unit. The control unit is configured to turn on both the first switch and the second switch when a voltage difference between the first battery pack and the second battery pack at a time point
(Continued)

at which both the first switch and the second switch are turned off is less than a threshold voltage.

20 Claims, 6 Drawing Sheets

(52) U.S. Cl.
CPC .......... *H01M 10/441* (2013.01); *H02J 7/0013* (2013.01); *H02J 2207/20* (2020.01)

(58) Field of Classification Search
CPC ...... H02J 7/0016; H02J 7/0018; H02J 7/0019; B60L 11/1866; B60L 58/02; H01M 10/441; H01M 2010/4271
USPC .......................................................... 320/126
See application file for complete search history.

(56) References Cited

U.S. PATENT DOCUMENTS

| | | | | |
|---|---|---|---|---|
| 6,879,134 B2* | 4/2005 | Stanesti | ................... | H02J 7/34 320/135 |
| 7,157,808 B2* | 1/2007 | Seligman | .............. | H02J 7/0024 307/48 |
| 7,507,497 B2* | 3/2009 | Yamashita | ........... | G01R 31/392 429/61 |
| 7,830,126 B2* | 11/2010 | Kawahara | ............... | B60L 58/22 320/160 |
| 8,159,191 B2* | 4/2012 | Chang | ...................... | F03D 9/25 320/136 |
| 8,183,837 B2* | 5/2012 | Iida | ...................... | H02J 7/0018 320/138 |
| 8,276,559 B2* | 10/2012 | Holz | ........................ | B60K 6/48 123/179.3 |
| 8,344,555 B2* | 1/2013 | Ichikawa | ................ | H02H 7/00 307/115 |
| 8,350,529 B2* | 1/2013 | Loncarevic | ........... | H02J 7/0016 320/122 |
| 8,368,347 B2* | 2/2013 | Mitsutani | ................ | B60L 58/15 320/104 |
| 8,471,413 B2* | 6/2013 | Ichikawa | .............. | H02J 7/1461 307/115 |
| 8,476,790 B2* | 7/2013 | Ichikawa | ............ | H01M 10/482 307/115 |
| 8,581,448 B2* | 11/2013 | Ichikawa | .............. | H02J 7/0049 307/115 |
| 8,933,667 B2* | 1/2015 | Park | ...................... | H02J 7/0024 320/126 |
| 9,030,167 B2* | 5/2015 | Yamaguchi | ......... | H01M 10/441 320/119 |
| 9,166,418 B2* | 10/2015 | Takagi | .................... | B60L 58/13 |
| 9,184,476 B2* | 11/2015 | Suzuki | .................. | H02J 7/0019 |
| 9,219,366 B2* | 12/2015 | Kim | ......................... | H02J 3/32 |
| 9,800,064 B2* | 10/2017 | Hwang | .................. | H02J 7/007 |
| 9,859,738 B2* | 1/2018 | Katayama | ............. | H02J 7/0077 |
| 9,891,685 B1* | 2/2018 | Marr | ....................... | G06F 1/30 |
| 9,910,471 B1* | 3/2018 | Marr | ........................ | G06F 1/26 |
| 10,131,241 B2* | 11/2018 | Lee | ........................ | B60L 53/14 |
| 10,193,344 B2* | 1/2019 | Sekita | ....................... | H02J 7/35 |
| 10,211,651 B2* | 2/2019 | Park | ...................... | H02J 7/0021 |
| 10,326,287 B2* | 6/2019 | Hoyt | ...................... | H02J 7/0019 |
| 10,347,952 B2* | 7/2019 | Choi | ...................... | H02J 7/0013 |
| 10,348,105 B2* | 7/2019 | Adaniya | ............... | H02J 7/0026 |
| 10,396,570 B2* | 8/2019 | Loncarevic | ........... | H02J 7/0016 |
| 10,710,469 B2* | 7/2020 | Koerner | ............... | H02J 7/0016 |
| 10,773,605 B2* | 9/2020 | Lee | ........................ | B60L 53/11 |
| 10,850,620 B2* | 12/2020 | Kahnt | ..................... | H02J 1/08 |
| 10,862,317 B2* | 12/2020 | Loncarevic | ........... | H02J 7/0016 |
| 10,923,774 B2* | 2/2021 | Kusano | ................ | G01R 31/374 |
| 10,946,766 B2* | 3/2021 | Hamada | ................ | B60L 58/12 |
| 10,978,751 B2* | 4/2021 | Bober | .................. | G01R 31/371 |
| 10,978,888 B2* | 4/2021 | Ono | ........................ | B60L 58/14 |
| 11,005,277 B2* | 5/2021 | Oukassi | ............... | H01M 10/425 |
| 11,038,213 B2* | 6/2021 | Mori | ...................... | H02J 7/0047 |
| 11,056,900 B2* | 7/2021 | Dang | .................... | H02J 7/0071 |
| 11,221,367 B2* | 1/2022 | Yamamoto | ........... | G01R 31/367 |
| 11,233,419 B2* | 1/2022 | Hendrix | ................ | H02P 31/00 |
| 2004/0155627 A1* | 8/2004 | Stanesti | ................ | H02J 7/0069 320/127 |
| 2006/0103350 A1* | 5/2006 | Lai | ........................ | H02J 7/0016 320/118 |
| 2007/0247106 A1* | 10/2007 | Kawahara | ............... | B60L 58/15 320/104 |
| 2010/0052615 A1* | 3/2010 | Loncarevic | ........... | H02J 7/0016 320/118 |
| 2010/0079116 A1* | 4/2010 | Thivierge | ................ | B60L 58/21 320/153 |
| 2010/0108009 A1* | 5/2010 | Holz | ........................ | B60K 6/48 123/179.3 |
| 2010/0127669 A1* | 5/2010 | Iida | ........................ | B60L 58/12 320/162 |
| 2010/0296204 A1* | 11/2010 | Ichikawa | ................... | B60L 3/04 361/15 |
| 2011/0057626 A1* | 3/2011 | Scrimshaw | ............. | H02J 7/345 320/166 |
| 2011/0089897 A1* | 4/2011 | Zhang | ................. | H02J 7/00308 320/116 |
| 2011/0156661 A1* | 6/2011 | Mehta | .................... | H02J 7/0071 320/160 |
| 2011/0227534 A1* | 9/2011 | Mitsutani | ................ | B60L 58/20 320/109 |
| 2012/0217811 A1* | 8/2012 | Marien | .................... | H02J 7/007 307/71 |
| 2012/0268070 A1* | 10/2012 | Park | ...................... | H02J 7/0024 320/126 |
| 2012/0293112 A1* | 11/2012 | Suzuki | ............... | H01M 10/482 320/107 |
| 2012/0313439 A1* | 12/2012 | Yamaguchi | ......... | H01M 10/465 307/71 |
| 2013/0099594 A1* | 4/2013 | Ichikawa | .............. | B60L 3/0053 307/115 |
| 2013/0099595 A1* | 4/2013 | Ichikawa | .............. | H02J 7/1438 307/115 |
| 2013/0099596 A1* | 4/2013 | Ichikawa | .......... | H01M 10/4264 307/115 |
| 2013/0207613 A1* | 8/2013 | Loncarevic | ........... | H02J 7/0016 320/134 |
| 2013/0234672 A1* | 9/2013 | Kubota | ................ | G01R 31/396 320/134 |
| 2014/0002003 A1* | 1/2014 | Kim | .................... | H01M 10/441 320/103 |
| 2014/0009117 A1* | 1/2014 | Ishii | ................... | H01M 10/482 320/126 |
| 2014/0015534 A1* | 1/2014 | Katayama | ............... | H02J 7/007 324/430 |
| 2014/0055094 A1* | 2/2014 | Takagi | .................... | B60L 58/13 320/118 |
| 2015/0002095 A1* | 1/2015 | Wada | ...................... | B60L 58/22 320/112 |
| 2015/0042284 A1* | 2/2015 | Murata | .................... | H02J 7/14 320/126 |
| 2015/0137824 A1* | 5/2015 | Nishihara | ............... | B60L 58/15 324/434 |
| 2015/0194707 A1* | 7/2015 | Park | ................... | H01M 10/4207 429/50 |
| 2015/0222117 A1* | 8/2015 | Im | ........................ | H02J 7/0019 307/52 |
| 2016/0049813 A1* | 2/2016 | Takizawa | ............... | H02J 7/0021 320/112 |
| 2016/0226269 A1* | 8/2016 | Hwang | .................. | H02J 7/0022 |
| 2016/0372928 A1* | 12/2016 | Sekita | ..................... | H02J 3/381 |
| 2017/0054134 A1* | 2/2017 | Choi | ...................... | G01R 31/36 |
| 2017/0113563 A1* | 4/2017 | Lee | ........................ | B60L 53/63 |
| 2017/0324257 A1* | 11/2017 | Adaniya | ................ | H02H 7/18 |
| 2017/0338666 A1* | 11/2017 | Christensen | ......... | G01R 31/392 |
| 2017/0345101 A1* | 11/2017 | Beaston | ..................... | H02J 3/32 |
| 2018/0090948 A1* | 3/2018 | Park | ........................ | H02J 7/34 |
| 2018/0241236 A1* | 8/2018 | Vasefi | .................. | H01M 10/482 |
| 2018/0254658 A1* | 9/2018 | Koerner | ............... | H02J 7/0016 |

(56) References Cited

U.S. PATENT DOCUMENTS

| | | | |
|---|---|---|---|
| 2018/0261889 A1* | 9/2018 | Kusano | G01R 31/3648 |
| 2018/0278065 A1* | 9/2018 | Hoyt | H02J 7/0024 |
| 2018/0375177 A1* | 12/2018 | Mori | H02J 7/0068 |
| 2019/0052119 A1* | 2/2019 | Hendrix | B60L 50/60 |
| 2019/0061548 A1* | 2/2019 | Lee | B60L 53/62 |
| 2019/0229541 A1* | 7/2019 | Ono | B60L 58/19 |
| 2019/0232947 A1* | 8/2019 | Tashiro | H01M 10/44 |
| 2019/0237974 A1* | 8/2019 | Dang | H02J 7/0071 |
| 2019/0273389 A1* | 9/2019 | Kahnt | B60L 7/10 |
| 2019/0379214 A1* | 12/2019 | Loncarevic | H02J 7/0016 |
| 2020/0003839 A1* | 1/2020 | Yamamoto | H01M 10/44 |
| 2020/0033392 A1* | 1/2020 | Tzivanopoulos | G01R 31/58 |
| 2020/0086761 A1* | 3/2020 | Hamada | B60L 58/19 |
| 2020/0212686 A1* | 7/2020 | Oukassi | H02J 7/0024 |
| 2020/0227925 A1* | 7/2020 | Park | H01M 10/482 |
| 2020/0295407 A1* | 9/2020 | Bober | H02J 7/0019 |
| 2020/0376982 A1* | 12/2020 | Heatley | F02N 11/0866 |
| 2021/0048482 A1* | 2/2021 | Ukumori | G01R 31/36 |
| 2021/0050731 A1* | 2/2021 | Loncarevic | H02J 7/0016 |
| 2021/0066930 A1* | 3/2021 | Luo | H02J 7/0063 |
| 2021/0159548 A1* | 5/2021 | Deng | H02J 7/0032 |
| 2021/0175485 A1* | 6/2021 | Sieber | H01M 50/538 |
| 2021/0194253 A1* | 6/2021 | Lim | H01M 10/482 |
| 2021/0208202 A1* | 7/2021 | Xie | G01R 31/3648 |
| 2021/0249875 A1* | 8/2021 | Morimoto | H02J 7/0024 |

FOREIGN PATENT DOCUMENTS

| | | | | |
|---|---|---|---|---|
| EP | 3 691 077 A1 | 8/2020 | | |
| JP | 2003-244854 A | 8/2003 | | |
| JP | 2012-235610 A | 11/2012 | | |
| JP | 2015-070690 A | 4/2015 | | |
| KR | 10-1308711 B1 | 9/2013 | | |
| KR | 10-2014-0003201 A | 1/2014 | | |
| KR | 10-2014-0016750 A | 2/2014 | | |
| KR | 10-1516027 B1 | 5/2015 | | |
| KR | 10-2015-0081731 A | 7/2015 | | |
| KR | 10-2015-0091890 A | 8/2015 | | |
| KR | 10-2016-0132633 A | 11/2016 | | |
| KR | 10-2017-0022417 A | 3/2017 | | |
| KR | 10-2017-0080917 A | 7/2017 | | |
| WO | WO-2010103816 A1 * | 9/2010 | | H02J 7/00304 |
| WO | 2013/042165 A1 | 3/2013 | | |
| WO | WO-2013127099 A1 * | 9/2013 | | H01M 10/441 |

OTHER PUBLICATIONS

International Search Report issued in corresponding International Patent Application No. PCT/KR2019/001776, dated May 29, 2019.

Office Action dated Feb. 22, 2021, issued in corresponding Japanese Patent Application No. 2020-511901.

* cited by examiner

BATTERY CONTROL APPARATUS AND ENERGY STORAGE SYSTEM INCLUDING SAME

TECHNICAL FIELD

The present disclosure relates to a battery control apparatus, a battery control method and an energy storage system including the battery control apparatus for safely connecting a plurality of battery packs in parallel.

The present application claims priority to Korean Patent Application No. 10-2018-0053253 filed in the Republic of Korea on May 9, 2018, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages of free charging and discharging, a very low self-discharge rate and high energy density.

A battery control apparatus may include a single battery pack, but to expand the charge/discharge capacity, a new battery pack may be added. When the battery control apparatus includes a plurality of battery packs, the plurality of battery packs may be installed connectably in parallel. However, when connecting in parallel the plurality of battery packs included in the battery control apparatus, inrush current may flow due to a voltage difference between the plurality of battery packs. The inrush current may degrade the life of the battery packs, and cause severe physical damage to the battery packs and peripheral circuitry.

DISCLOSURE

Technical Problem

The present disclosure is designed to solve the above-described problem, and therefore the present disclosure is directed to providing a battery control apparatus a battery control method and an energy storage system including the battery control apparatus for protecting a plurality of battery packs and peripheral circuitry from physical damage due to the inrush current when connecting the plurality of battery packs in parallel.

These and other objects and advantages of the present disclosure may be understood by the following description and will be apparent from the embodiments of the present disclosure. Further, it will be readily understood that the objects and advantages of the present disclosure may be realized by the means set forth in the appended claims and combinations thereof.

Technical Solution

A battery control apparatus according to an aspect of the present disclosure is connected to a power conversion system through a first terminal and a second terminal of the power conversion system. The battery control apparatus includes a first battery pack, a second battery pack, a first switch connected in series to the first battery pack between the first terminal and the second terminal, a second switch connected in series to the second battery pack between the first terminal and the second terminal, and a control unit operably coupled to the first switch and the second switch. The control unit is configured to turn on both the first switch and the second switch to connect the first battery pack and the second battery pack in parallel, when a voltage difference between the first battery pack and the second battery pack at a first time point at which both the first switch and the second switch are turned off is less than a threshold voltage.

The control unit may be configured to turn on the first switch, when a voltage of the second battery pack at the first time point is higher than a voltage of the first battery pack by the threshold voltage or more.

The control unit may be configured to transmit a first command to the power conversion system to induce the power conversion system to supply a first constant power between the first terminal and the second terminal, when a state of charge (SOC) difference between the first battery pack and the second battery pack at a second time point which is later than the first time point is equal to or higher than a threshold SOC.

The control unit may be configured to transmit a second command to the power conversion system to induce the power conversion system to supply a second constant power between the first terminal and the second terminal, when the SOC difference between the first battery pack and the second battery pack at the second time point or a third time point which is later than the second time point is less than the threshold SOC. The second constant power is smaller than the first constant power.

The control unit may be configured to turn on the second switch to connect the first battery pack and the second battery pack in parallel, when the voltage of the first battery pack at a fourth time point which is later than the third time point is equal to or higher than the voltage of the second battery pack and the voltage difference between the first battery pack and the second battery pack is smaller than the threshold voltage.

The control unit may be configured to transmit the second command to the power conversion system, when the voltage of the first battery pack at the fourth time point is lower than the voltage of the second battery pack.

The control unit may be configured to transmit a third command to the power conversion system to induce the power conversion system to stop supplying the second constant power, when the voltage of the first battery pack at the fourth time point is higher than the voltage of the second battery pack by the threshold voltage or more.

The control unit may be configured to turn on the second switch to connect the first battery pack and the second battery pack in parallel, when the voltage difference between the first battery pack and the second battery pack at a fifth time point is smaller than the threshold voltage. The fifth time point is a time point at which a stabilization period has passed from a time point at which the power conversion system stopped supplying the second constant power in response to the third command.

The control unit may include a first slave controller configured to measure a voltage and a current of the first battery pack, a second slave controller configured to measure a voltage and a current of the second battery pack, and a master controller configured to control each of the first switch and the second switch based on the voltage and the current of each of the first battery pack and the second battery pack.

An energy storage system according to another aspect of the present disclosure includes the battery control apparatus, and the power conversion system connectable to the battery control apparatus through the first terminal and the second terminal.

A battery control method according to still another aspect of the present disclosure is for connecting in parallel a first battery pack connected in series to a first switch between a first terminal and a second terminal of a power conversion system, and a second battery pack connected in series to a second switch between the first terminal and the second terminal. The battery control method includes determining whether a voltage difference between the first battery pack and the second battery pack at a first time point at which both the first switch and the second switch are turned off is less than a threshold voltage, turning on both the first switch and the second switch to connect the first battery pack and the second battery pack in parallel when the voltage difference between the first battery pack and the second battery pack at the first time point is less than the threshold voltage, turning on the first switch when a voltage of the second battery pack at the first time point is higher than a voltage of the first battery pack by the threshold voltage or more, and transmitting a first command to the power conversion system to induce the power conversion system to supply a first constant power between the first terminal and the second terminal when an SOC difference between the first battery pack and the second battery pack at a second time point which is later than the first time point is equal to or higher than a threshold SOC.

The battery control method may further include transmitting a second command to the power conversion system to induce the power conversion system to supply a second constant power between the first terminal and the second terminal, when the SOC difference between the first battery pack and the second battery pack at the second time point or a third time point which is later than the second time point is less than the threshold SOC. The second constant power is smaller than the first constant power.

Advantageous Effects

According to at least one of the embodiments of the present disclosure, it is possible to protect a plurality of battery packs and peripheral circuitry from physical damage due to the inrush current when connecting the plurality of battery packs in parallel.

Additionally, according to at least one of the embodiments of the present disclosure, before connecting the plurality of battery packs in parallel, a battery pack with lower voltage is charged to reduce a voltage difference between the plurality of battery packs, thereby reducing unnecessary energy consumption compared to when discharging a battery pack with higher voltage.

Further, according to at least one of the embodiments of the present disclosure, a battery pack being charged is connected in parallel with other battery pack by taking into account a voltage drop resulting from the internal resistance of the battery pack being charged, thereby reducing the magnitude of inrush current that may flow when connecting the plurality of battery packs in parallel.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
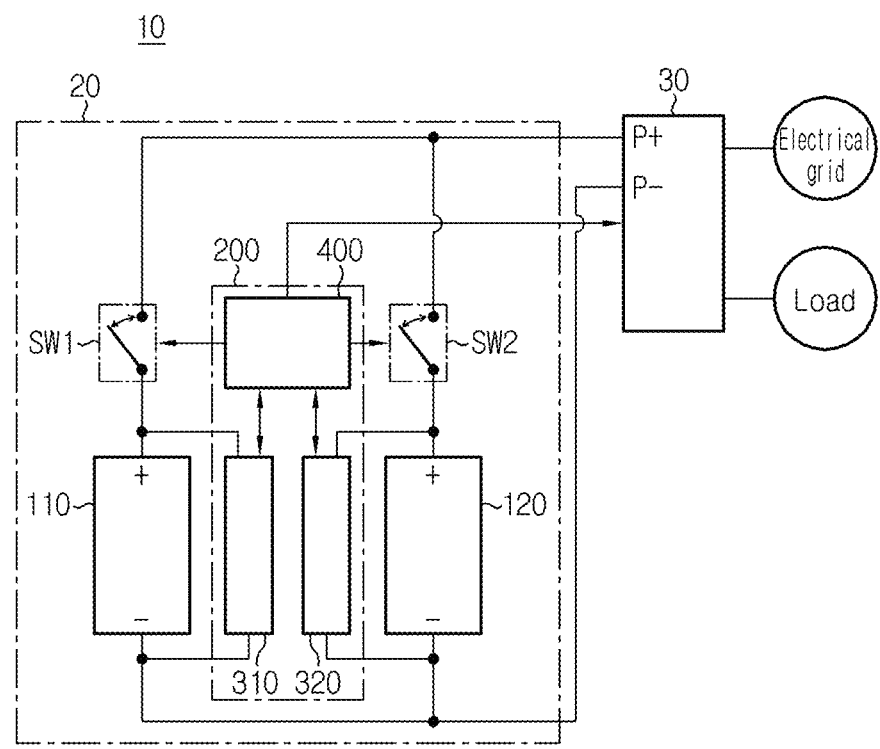
FIG. 1 is an exemplary diagram showing the configuration of an energy storage system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

FIG. 1 is an exemplary diagram showing the configuration of an energy storage system 30 according to an embodiment of the present disclosure.

Referring to FIG. 1, the energy storage system 10 includes a battery control apparatus 20 and a power conversion system 30. The battery control apparatus 20 is electrically connectable to the power conversion system 30 through a first terminal P+ and a second terminal P− of the power conversion system 30. The battery control apparatus 20 includes a first battery pack 110, a second battery pack 120, a first switch SW1, a second switch SW2 and a control unit 200.

The first battery pack 110 includes at least one battery cell. The second battery pack 120 includes at least one battery cell. Each battery cell included in the first battery pack 110 and the second battery pack 120 may be, for example, a rechargeable battery such as a lithium ion battery, a lithium polymer battery, a nickel cadmium battery, a nickel hydrogen battery or a nickel zinc battery. The first battery pack 110 and the second battery pack 120 may be manufactured with the same rated voltage, rated current and design capacity. However, the first battery pack 110 and the second battery pack 120 may be different in State Of Health (SOH) depending on the number of charge/discharge cycles of each of the first battery pack 110 and the second battery pack 120.

The first switch SW1 is connected in series to the first battery pack 110 between the first terminal P+ and the second terminal P−. For example, as shown in FIG. 1, one end of the first switch SW1 is connected to the positive terminal of the first battery pack 110, the other end of the first switch SW1 is connected to the first terminal P+, and the negative terminal of the first battery pack 110 is connected to the second terminal P−. When the first switch SW1 is turned on, the first battery pack 110 is electrically connected between the first terminal P+ and the second terminal P− through the first switch SW1. When the first switch SW1 is turned off, the first battery pack 110 is electrically separated from at least one of the first terminal P+ and the second terminal P−.

The second switch SW2 is connected in series to the second battery pack 120 between the first terminal P+ and the second terminal P−. For example, as shown in FIG. 1, one end of the second switch SW2 is connected to the positive terminal of the second battery pack 120, the other end of the second switch SW2 is connected to the first terminal P+, and the negative terminal of the second battery pack 120 is connected to the second terminal P−. When the second switch SW2 is turned on, the second battery pack 120 is electrically connected between the first terminal P+ and the second terminal P− through the second switch SW2. When the second switch SW2 is turned off, the second battery pack 120 is electrically separated from at least one of the first terminal P+ and the second terminal P−.

Each of the first switch SW1 and the second switch SW2 may be implemented using any one of known switching elements such as a relay or a Field Effect Transistor (FET) or a combination of two or more of them.

The control unit 200 is configured to monitor the state of the first battery pack 110 and the state of the second battery pack 120 respectively. The control unit 200 is configured to control the first switch SW1 and the second switch SW2 respectively. The control unit 200 may include a first slave controller 310, a second slave controller 320 and a master controller 400.

The first slave controller 310 is configured to monitor the operational state of the first battery pack 110 periodically. The first slave controller 310 includes a voltage sensor, a current sensor and a processor. The voltage sensor of the first slave controller 310 is configured to measure the voltage across the first battery pack 110. The current sensor of the first slave controller 310 is configured to measure the current flowing through the first battery pack 110. The first slave controller 310 is configured to calculate the State Of Charge (SOC) of the first battery pack 110 based on at least one of the voltage and the current of the first battery pack 110. The first slave controller 310 is configured to periodically transmit first data indicating at least one of the voltage and the SOC of the first battery pack 110 to the master controller 400.

The second slave controller 320 is configured to periodically monitor the operational state of the second battery pack 120 periodically. The second slave controller 320 includes a voltage sensor, a current sensor and a processor. The voltage sensor of the second slave controller 320 is configured to measure the voltage across the second battery pack 120. The current sensor of the second slave controller 320 is configured to measure the current flowing through the second battery pack 120. The second slave controller 320 is configured to calculate the SOC of the second battery pack 120 based on at least one of the voltage and the current of the second battery pack 120. The second slave controller 320 is configured to periodically transmit second data indicating at least one of the voltage and the SOC of the second battery pack 120 to the master controller 400.

A variety of known algorithms may be used to calculate the SOC. For example, the SOC may be calculated based on the voltage and the current of each battery pack using ampere counting, an equivalent circuit model or a Kalman filter.

The voltage sensor and the current sensor may be implemented from known components. The voltage sensor is connected to the positive electrode and the negative electrode of the battery pack and outputs an electrical signal corresponding to a voltage difference to the processor. The current sensor outputs an electrical signal corresponding to the magnitude of charge current or discharge current of the battery pack to the processor. The voltage sensor includes a differential amplifier circuit, and the current sensor includes a sense resistor or a hall sensor.

The master controller 400 is operably coupled to the first slave controller 310, the second slave controller 320, the first switch SW1, the second switch SW2 and the power conversion system 30. The master controller 400 is configured to calculate a voltage difference and an SOC difference between the first battery pack 110 and the second battery pack 120. Additionally, for parallel connection of the first battery pack 110 and the second battery pack 120, the master controller 400 may individually turn on or off the first switch SW1 and the second switch SW2 by executing software pre-stored thereof. Additionally, to charge at least one of the first battery pack 110 and the second battery pack 120, the master controller 400 may command the power conversion system 30 to induce the power conversion system 30 to supply any one of a first constant power and a second constant power between the first terminal P+ and the second terminal P− or may command the power conversion system 30 to induce the power conversion system 30 to stop the supply.

Each of the first slave controller 310, the second slave controller 320 and the master controller 400 may physically include at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions.

The memory device may be embedded in the processor of at least one of the first slave controller 310, the second slave controller 320 and the master controller 400, and the memory device may include, for example RAM, ROM, register, hard disk, an optical recording medium or a magnetic recording medium. The memory device may store, update and/or erase programs including various control logics that are executed by at least one of the first slave controller 310, the second slave controller 320 and the master controller 400, and/or data created when the control logics are executed.

The first slave controller 310, the second slave controller 320 and the master controller 400 are equipped with a communication interface. The communication interface may be a CAN communication modem that supports CAN communication. The master controller 400 individually transmits and receives data to/from the first slave controller 310 and the second slave controller 320 via the communication interface.

The power conversion system 30 is operably coupled to the control unit 200. The power conversion system 30 may be electrically connected to at least one of an electrical grid and an electrical load. The power conversion system 30 may convert power supplied from the system or the battery control apparatus 20 and supply it to the electrical load. In response to a command from the control unit 200, the power conversion system 30 is configured to generate a constant power of a magnitude corresponding to the command using the input power from the electrical grid, and selectively supply the generated constant power between the first terminal P+ and the second terminal P−.

Figure 2:
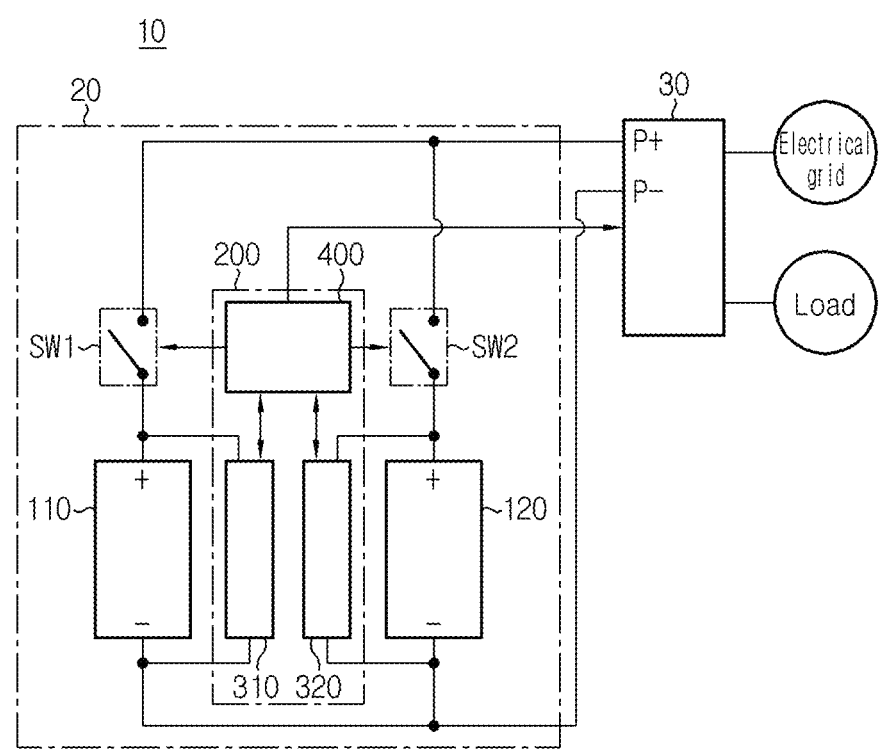
FIGS. 2 to 4 are diagrams for reference in describing operations that may be performed to connect a first battery pack and a second battery pack of FIG. 1 in parallel.
Figure 3:
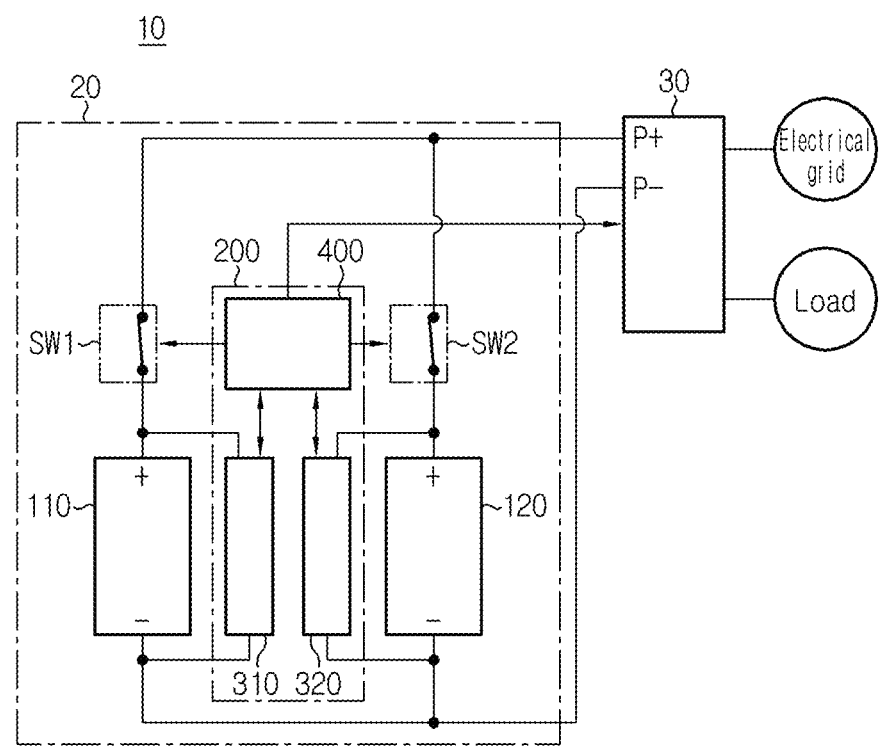
Figure 4:
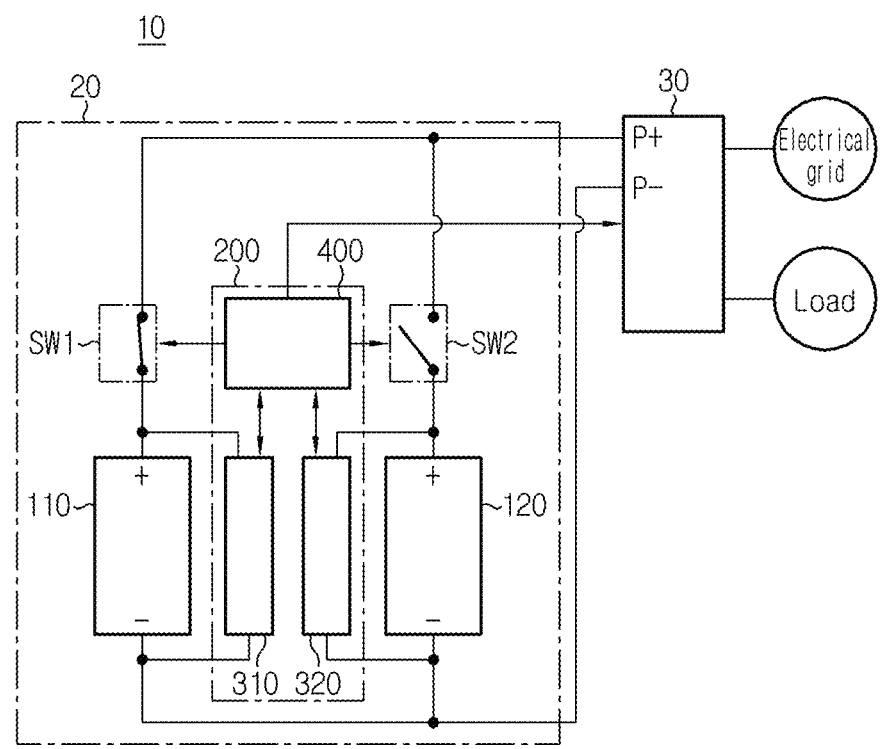

FIGS. 2 to 4 are diagrams for reference in describing operations that may be performed to connect the first battery pack 110 and the second battery pack 120 of FIG. 1 in parallel.

First, FIG. 2 shows a situation at the time point when both the first switch SW1 and the second switch SW2 are turned off. Referring to FIG. 2, when the first switch SW1 is turned off, the first battery pack 110 is electrically separated from at least one of the first terminal P+ and the second terminal P−. And, when the second switch SW2 is turned off, the second battery pack 120 is also electrically separated from at least one of the first terminal P+ and the second terminal P−. The control unit 200 measures each of the voltage of the first battery pack 110 and the voltage of the second battery pack 120, and calculates a voltage difference between the first battery pack 110 and the second battery pack 120. Subsequently, the control unit 200 compares the voltage difference between the first battery pack 110 and the second battery pack 120 with a first threshold voltage. The first threshold voltage may be preset such as, for example, 2.5V. Alternatively, the control unit 200 may calculate the first threshold voltage based on the SOH of the first battery pack 110 and the SOH of the second battery pack 120. That is, the first threshold voltage is not preset, and instead, may change depending on the SOH of the first battery pack 110 and the SOH of the second battery pack 120. A lookup table in which the first threshold voltage may be looked up according to at least one of the SOH of the first battery pack 110 and the SOH of the second battery pack 120 may be stored in the memory device of the master controller 400 and may be referred to by the master controller 400.

The SOH may be calculated by counting the number of charge/discharge cycles of the first battery pack 110 and the second battery pack 120 by the master controller 400. The number of charge/discharge cycles may be calculated from a voltage change of the first battery pack 110 and the second battery pack 120. That is, when a charge or discharge event occurs at the voltage of the battery pack within a particular voltage range, the SOH may be calculated by increasing the number of charge/discharge cycles by 1, and calculating a ratio of a reference number of charge/discharge cycles corresponding to the SOH lower limit of the battery pack and the current number of charge/discharge cycles.

FIG. 3 shows a situation at the time point when both the first switch SW1 and the second switch SW2 are turned on. When a voltage difference between the first battery pack 110 and the second battery pack 120 at the time point at which both the first switch SW1 and the second switch SW2 are turned off is less than the first threshold voltage, the control unit 200 turns on both the first switch SW1 and the second switch SW2. It is because the voltage difference between the first battery pack 110 and the second battery pack 120 of less than the first threshold voltage does not generate inrush current having a large magnitude enough to cause physical damage to the battery control apparatus 20.

FIG. 4 shows a situation at the time point when the first switch SW1 is turned on and the second switch SW2 is turned off. When the voltage of the second battery pack 120 at the time point at which both the first switch SW1 and the second switch SW2 are turned off is higher than the voltage of the first battery pack 110 by the first threshold voltage or more, the control unit 200 turns on the first switch SW1 connected in series to the first battery pack 110 while turning off the second switch SW2 connected in series to the second battery pack 120. Accordingly, the first battery pack 110 is electrically connected to and between the first terminal P+ and the second terminal P− through the first switch SW1 that has turned on, thus the first battery pack 110 is chargeable with the constant power supplied by the power conversion system 30. When an SOC difference between the first battery pack 110 and the second battery pack 120 at the time point at which the first switch SW1 is turned on and the second switch SW2 is turned off is equal to or larger than a threshold SOC, the control unit 200 transmits a first command to the power conversion system 30. On the contrary, when the SOC difference between the first battery pack 110 and the second battery pack 120 at the time point at which the first switch SW1 is turned on and the second switch SW2 is turned off is less than the threshold SOC, the control unit 200 transmits a second command to the power conversion system 30. The first command is for requesting the power conversion system 30 to supply the first constant power between the first terminal P+ and the second terminal P−. That is, the power conversion system 30 may supply the first constant power between the first terminal P+ and the second terminal P− in response to the first command. The second command is for requesting the power conversion system 30 to supply the second constant power that is lower than the first constant power between the first terminal P+ and the second terminal P−. That is, the power conversion system 30 may supply the second constant power between the first terminal P+ and the second terminal P− in response to the second command. For example, when the SOC of the first battery pack 110 is lower than the SOC of the second battery pack 120 by the threshold SOC or more, the first battery pack 110 is charged with the first constant power, and from the time point at which the sum of the SOC of the first battery pack 110 and the threshold SOC is equal to the SOC of the second battery pack 120, the first battery pack 110 is charged with the second constant power. The threshold SOC may be preset.

Alternatively, the control unit 200 may calculate the threshold SOC based on the SOH of the first battery pack 110 and the SOH of the second battery pack 120. That is, the threshold SOC is not preset, and instead, may change depending on the SOH of the first battery pack 110 and the SOH of the second battery pack 120. For example, the control unit 200 may determine a threshold SOC corresponding to at least one of the SOH of the first battery pack 110 and the SOH of the second battery pack 120 by referring to a lookup table that defines the threshold SOC according to an average value, a maximum or a minimum value of the SOH of the first battery pack 110 and the SOH of the second battery pack 120. To determine the threshold SOC from the SOH of at least one of the first and second battery packs 110, 120, the lookup table in which the threshold SOC may be looked up by the SOH of at least one of the first and second battery packs 110, 120 may be stored in the memory device of the master controller 400 and may be referred to by the master controller 400.

The control unit 200 may periodically calculate the voltage difference between the first battery pack 110 and the second battery pack 120 while the first battery pack 110 is charged with the second constant power. When the voltage of the first battery pack 110 is lower than the voltage of the second battery pack 120 while the first battery pack 110 is charged with the second constant power, the control unit 200 may keep turning on the first switch SW1 and turning off the second switch SW2.

When the voltage of the first battery pack 110 is equal to or higher than the voltage of the second battery pack 120 and the voltage difference between the first battery pack 110 and the second battery pack 120 is smaller than a second threshold voltage while the first battery pack 110 is charged with the second constant power, the control unit 200 may turn on the second switch SW2 as shown in FIG. 3. Alternatively, when the voltage of the first battery pack 110 is equal to or higher than the voltage of the second battery pack 120 and the voltage difference between the first battery pack 110 and the second battery pack 120 is equal to the second threshold voltage while the first battery pack 110 is charged with the second constant power, the control unit 200 may turn on the second switch SW2 as shown in FIG. 3. The second threshold voltage corresponds to a voltage drop by the internal resistance and charge current of each of the battery packs 110, 120. The second threshold voltage may be preset to be equal to or higher or lower than the first threshold voltage. Alternatively, the control unit 400 may determine the second threshold voltage based on the SOH of any one battery pack 110 or 120 being charged with the second constant power. As the SOH of any one battery pack being charged with the second constant power is lower, the second threshold voltage determined by the control unit 400 may be higher. For example, when the SOH of any one battery pack being charged with the second constant power is 98%, the second threshold voltage may be determined as 3.0V, and when the SOH is 96%, the second threshold voltage may be determined as 3.3V. A lookup table in which the second threshold voltage may be looked up according to the SOH of any one battery pack being charged with the second constant power may be stored in the memory device of the master controller 400 and may be referred to by the master controller 400.

When the voltage of the first battery pack 110 is higher than the voltage of the second battery pack 120 by the second threshold voltage or more while the first battery pack 110 is charged with the second constant power, the control unit 200 may transmit a third command to the power conversion system 30 or stop transmitting the second command. That is, the third command may be outputted from the control unit 400 when the voltage difference between the first battery pack 110 and the second battery pack 120 is equal to or larger than the second threshold voltage while any one of the first battery pack 110 and the second battery pack 120 is charged with the second constant power. When the third command is transmitted from the control unit 200 or transmission of the second command is stopped while the second constant power is supplied, the power conversion system 30 may be configured to stop supplying the second constant power.

The control unit 200 may determine whether the voltage difference between the first battery pack 110 and the second battery pack 120 at the time point at which a preset stabilization period has passed from the time point at which the power conversion system 30 stopped supplying the second constant power is less than the first threshold voltage. The preset stabilization period is a period for removing polarization occurring while each battery pack is charged with the second constant power. When the voltage difference between the first battery pack 110 and the second battery pack 120 at the time point at which the stabilization period has passed is less than the first threshold voltage, the control unit 200 turns on the second switch SW2 as well. Accordingly, the first battery pack 110 and the second battery pack 120 are connected in parallel between the first terminal P+ and the second terminal P−. On the contrary, when the voltage difference between the first battery pack 110 and the second battery pack 120 at the time point at which the stabilization period has passed is equal to or larger than the first threshold voltage, the control unit 200 turns off the first switch SW1. Accordingly, both the first battery pack 110 and the second battery pack 120 are electrically separated from at least one of the first terminal P+ and the second terminal P−.

Figure 5:
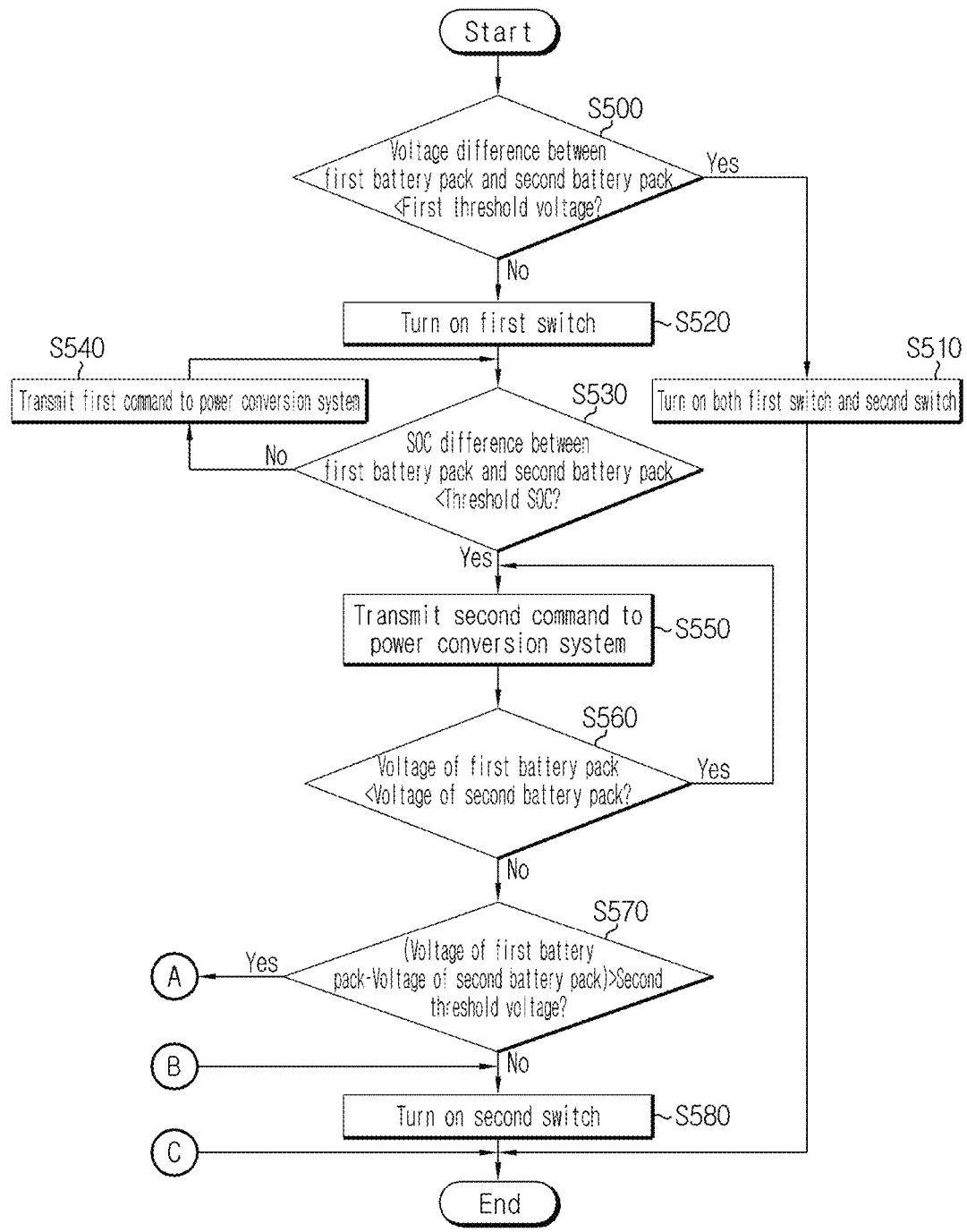
FIGS. 5 and 6 are flowcharts showing a method for connecting a first battery pack and a second battery pack in parallel according to another embodiment of the present disclosure.
Figure 6:
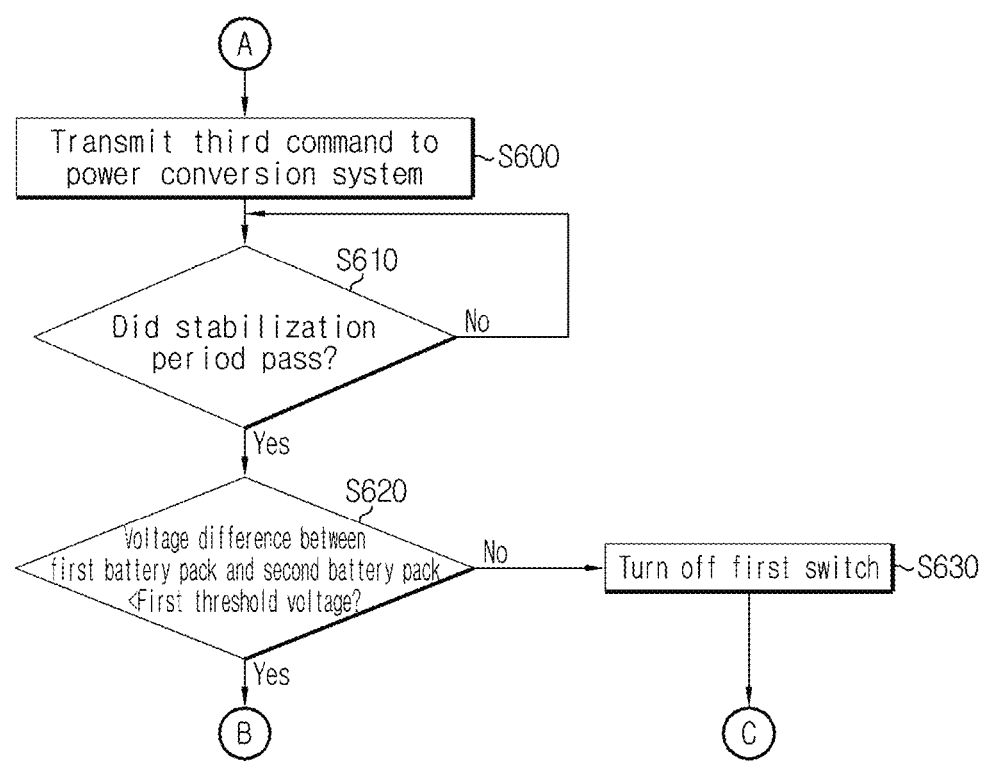

FIGS. 5 and 6 are flowcharts showing a method for connecting the first battery pack 110 and the second battery pack 120 in parallel according to another embodiment of the present disclosure. The method shown in FIG. 5 starts when both the first switch SW1 and the second switch SW2 are turned off. For convenience of description, assume that the voltage of the first battery pack 110 is lower than the voltage of the second battery pack 120 at the time point at which the method shown in FIG. 5 starts.

Referring to FIGS. 1 to 6, in step S500, the control unit 200 determines whether a voltage difference between the first battery pack 110 and the second battery pack 120 is less than the first threshold voltage. In an example, when the voltage of the first battery pack 110 is 200V, the voltage of the second battery pack 120 is 202V and the first threshold voltage is 2.5V, a value of the step S500 is "Yes". In another example, when the voltage of the first battery pack 110 is 200V, the voltage of the second battery pack 120 is 205V and the first threshold voltage is 2.5V, a value of the step S500 is "No". When the value of the step S500 is "Yes", step S510 is performed. When the value of the step S500 is "No", step S520 is performed.

In step S510, the control unit 200 turns on both the first switch SW1 and the second switch SW2. This is for electrically connecting the first battery pack 110 and the second battery pack 120 in parallel.

In step S520, the control unit 200 turns on the first switch SW1. That is, when the voltage of the second battery pack 120 is higher than the voltage of the first battery pack 110 by the first threshold voltage or more, the first switch SW1 is turned on. In this instance, the second switch SW2 is maintained in a turn off state. Accordingly, the first battery pack 110 is chargeable with the power supplied between the first terminal P+ and the second terminal P−.

In step S530, the control unit 200 determines whether an SOC difference between the first battery pack 110 and the second battery pack 120 is less than the threshold SOC. In an example, when the SOC of the first battery pack 110 is 66%, the SOC of the second battery pack 120 is 75% and the threshold SOC is 8%, the SOC difference is 9%, and thus a value of the step S530 is "No". In another example, when the SOC of the first battery pack 110 is 70%, the SOC of the second battery pack 120 is 75% and the threshold SOC is 8%, the SOC difference is 5%, and thus a value of the step S530 is "Yes". When the value of the step S530 is "No", step S540 is performed. When the value of the step S30 is "Yes", step S550 is performed.

In step S540, the control unit 200 transmits a first command to the power conversion system 30. The power conversion system 30 supplies the first constant power between the first terminal P+ and the second terminal P− in response to the first command. Accordingly, the first battery pack 110 may be charged with the first constant power. The first constant power may correspond to a first ratio of a preset maximum power. The first ratio may be larger than 0 and smaller than 1. For example, when the maximum power is 1000 W and the first ratio is 0.5, the first constant power is 500 W. When the voltage of the first battery pack 110 at a certain time point at which the first constant power of 500 W is supplied is 300V, as the charge current of 5/3 A flows in the first battery pack 110, the first battery pack 110 may be charged.

In step S550, the control unit 200 transmits a second command to the power conversion system 30. The power conversion system 30 supplies the second constant power between the first terminal P+ and the second terminal P− in response to the second command. Accordingly, the first battery pack 110 may be charged with the second constant power. The second constant power may correspond to a second ratio of the preset maximum power. The second ratio may be larger than 0 and smaller than 1. For example, when the maximum power is 1000 W and the second ratio is 0.1 that is smaller than the first ratio, the second constant power is 100 W. When the voltage of the first battery pack 110 at a certain time point at which the second constant power of 100 W is supplied is 300V, as the charge current of 1/3 A flows in the first battery pack 110, the first battery pack 110 may be charged. Accordingly, those skilled in the art will easily understand that when the second constant power is supplied, the first battery pack 110 will be charged more slowly than when the first constant power is supplied, and a voltage drop resulting from the charge current will reduce.

In step S560, the control unit 200 determines whether the voltage of the first battery pack 110 is lower than the voltage of the second battery pack 120. When a value of the step S560 is "Yes", step S550 is performed. When the value of the step S560 is "No", step S570 is performed.

In step S570, the control unit 200 determines whether a voltage difference between the first battery pack 110 and the second battery pack 120 is larger than the second threshold voltage. When a value of the step S570 is "No", step S580 is performed. When the value of the step S570 is "Yes", step S600 is performed.

In step S580, the control unit 200 turns on the second switch SW2. As the first switch SW1 has been already turned on from the step S520, the first battery pack 110 and the second battery pack 120 are connected in parallel between the first terminal P+ and the second terminal P− from the time point at which the second switch SW2 is also turned on by the step S580.

In step S600, the control unit 200 transmits a third command to the power conversion system 30. The power conversion system stops supplying the second constant power in response to the third command. "Yes" as the value of the step S570 indicates that the voltage of the first battery pack 110 increased so much fast compared to the period during which the second constant power was supplied. It is a situation in which actually, the voltage of the first battery pack 110 sharply increased, or it is highly likely that the voltage of the first battery pack 110 was measured incorrectly. Accordingly, the control unit 200 may transmit the third command to temporarily stop charging the first battery pack 110.

In step S610, the control unit 200 determines whether the stabilization period has passed from the time point at which the third command was transmitted. During the stabilization period, the voltage of the first battery pack 110 gradually reduces toward the open circuit voltage corresponding to the SOC of the first battery pack 110. When a value of the step S610 is "Yes", step S620 is performed.

In step S620, the control unit 200 determines whether the voltage difference between the first battery pack 110 and the second battery pack 120 is less than the first threshold voltage. When a value of the step S620 is "Yes", step S580 is performed. When the value of the step S620 is "No", step S630 is performed.

In step S630, the control unit 200 turns off the first switch SW1. Accordingly, the first battery pack 110 is also electrically separated from at least one of the first terminal P+ and the second terminal P−. The step S500 may be automatically performed again after the time point at which the step S630 was performed.

The battery control apparatus 20 described with reference to FIGS. 1 to 6 may protect the plurality of battery packs and peripheral circuitry from physical damage due to the inrush current when connecting the plurality of battery packs in parallel. Additionally, before connecting the plurality of battery pack in parallel, the battery control apparatus 20 may charge a battery pack with lower voltage to reduce a voltage difference between the plurality of battery packs, thereby reducing unnecessary energy consumption compared to when discharging a battery pack with higher voltage. Further, the battery control apparatus 20 may connect the battery pack being charged to other battery pack in parallel by taking into account a voltage drop resulting from the internal resistance of the battery pack being charged, thereby reducing the magnitude of inrush current that may flow when connecting the plurality of battery packs in parallel.

The embodiments of the present disclosure described hereinabove are not implemented only through the apparatus and method, and may be implemented through programs that perform functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

DESCRIPTION OF REFERENCE NUMERALS

10: Energy storage system
20: Battery control apparatus
30: Power conversion system
110: First battery pack
120: Second battery pack
SW1: First switch
SW2: Second switch
200: Control unit
310: First slave controller
320: Second slave controller
400: Master controller

What is claimed is:

1. A battery control apparatus connectable to a power conversion system through a first terminal and a second terminal of the power conversion system, the battery control apparatus comprising:
a first battery pack;
a second battery pack;
a first switch connected in series to the first battery pack between the first terminal and the second terminal;
a second switch connected in series to the second battery pack between the first terminal and the second terminal; and
a control unit operably coupled to the first switch and the second switch, the control unit being configured to turn on both the first switch and the second switch to connect the first battery pack and the second battery pack in parallel between the first terminal and the second terminal, if a voltage difference between the first battery pack and the second battery pack is less than a threshold voltage at a first time point at which both the first switch and the second switch are turned off,
wherein the control unit is further configured to calculate the threshold voltage based on a state of health (SOH) of the first battery pack and a SOH of the second battery pack.

2. The battery control apparatus according to claim 1, wherein the control unit is further configured to turn on the first switch, if a voltage of the second battery pack is higher than a voltage of the first battery pack by the threshold voltage or more at the first time point.

3. The battery control apparatus according to claim 1, wherein the control unit includes:
a first slave controller configured to measure a voltage and a current of the first battery pack;
a second slave controller configured to measure a voltage and a current of the second battery pack; and
a master controller configured to control each of the first switch and the second switch based on the voltage and the current of each of the first battery pack and the second battery pack.

4. An energy storage system, comprising:
the battery control apparatus according to claim 1,
wherein the power conversion system is connected to the battery control apparatus through the first terminal and the second terminal.

5. The battery control apparatus according to claim 1, wherein the control unit includes a lookup table and is further configured to look up the threshold voltage from the lookup table based on the SOH of at least one of the first battery pack and the second battery pack.

6. The battery control apparatus according to claim 1, wherein the control unit is further configured to calculate the SOH of at least one of the first battery pack and the second battery pack based on a number of charge or discharge cycles of the at least one of the first battery pack and the second battery pack.

7. A battery control apparatus connectable to a power conversion system through a first terminal and a second terminal of the power conversion system, the battery control apparatus comprising:
a first battery pack;
a second battery pack;
a first switch connected in series to the first battery pack between the first terminal and the second terminal;
a second switch connected in series to the second battery pack between the first terminal and the second terminal; and
a control unit operably coupled to the first switch and the second switch, the control unit being configured to:
turn on both the first switch and the second switch to connect the first battery pack and the second battery pack in parallel between the first terminal and the second terminal, if a voltage difference between the first battery pack and the second battery pack is less than a first threshold voltage at a first time point in a first charging cycle at which both the first switch and the second switch are turned off, and
turn on the first switch and maintain the second switch off, if a voltage of the second battery pack is higher than a voltage of the first battery pack by the first threshold voltage or more at the first time point,
wherein the control unit is further configured to transmit a first command to the power conversion system to induce the power conversion system to supply a first constant power between the first terminal and the second terminal, if a state of charge (SOC) difference between the first battery pack and the second battery pack is equal to or higher than a threshold SOC at a second time point after the first time point in the first charging cycle with the first switch turned on and the second switch off, and
wherein each of a SOC of the first battery pack and a SOC of the second battery pack is determined based on a voltage and a current of a corresponding one of the first and second battery packs using ampere counting, an equivalent circuit model, or a Kalman filter.

8. The battery control apparatus according to claim 7, wherein the control unit is further configured to calculate the first threshold voltage based on a state of health (SOH) of the first battery pack and a SOH of the second battery pack.

9. The battery control apparatus according to claim 7, wherein:
the control unit is further configured to transmit a second command to the power conversion system to induce the power conversion system to supply a second constant power between the first terminal and the second terminal, if the SOC difference between the first battery pack and the second battery pack is less than the threshold SOC at the second time point or a third time point after the second time point in the first charging cycle with the first switch turned on and the second switch off; and the second constant power is smaller than the first constant power.

10. The battery control apparatus according to claim 9, wherein the control unit is further configured to turn on the second switch to connect the first battery pack and the second battery pack in parallel, if:
   the voltage of the first battery pack is equal to or higher than the voltage of the second battery pack at a fourth time point after the third time point in the first charging cycle, and
   the voltage difference between the first battery pack and the second battery pack is smaller than the threshold voltage.

11. The battery control apparatus according to claim 10, wherein the control unit is further configured to transmit the second command to the power conversion system, if the voltage of the first battery pack is lower than the voltage of the second battery pack at the fourth time point.

12. The battery control apparatus according to claim 10, wherein the control unit is further configured to transmit a third command to the power conversion system to induce the power conversion system to stop supplying the second constant power, if the voltage of the first battery pack is higher than the voltage of the second battery pack by the second threshold voltage or more at the fourth time point.

13. The battery control apparatus according to claim 12, wherein:
   the control unit is further configured to turn on the second switch to connect the first battery pack and the second battery pack in parallel, if the voltage difference between the first battery pack and the second battery pack is smaller than the first threshold voltage at a fifth time point in the first charging cycle; and
   the fifth time point is a time point at which a stabilization period has passed from a time point at which the power conversion system stopped supplying the second constant power in response to the third command.

14. A battery control method for connecting in parallel a first battery pack connected in series to a first switch between a first terminal and a second terminal of a power conversion system, and a second battery pack connected in series to a second switch between the first terminal and the second terminal, the battery control method comprising:
   determining whether a voltage difference between the first battery pack and the second battery pack is less than a first threshold voltage at a first time point in a first charging cycle at which both the first switch and the second switch are turned off;
   turning on both the first switch and the second switch to connect the first battery pack and the second battery pack in parallel, if the voltage difference between the first battery pack and the second battery pack is less than the first threshold voltage at the first time point;
   turning on the first switch, if a voltage of the second battery pack is higher than a voltage of the first battery pack by the first threshold voltage or more at the first time point; and
   transmitting a first command to the power conversion system to induce the power conversion system to supply a first constant power between the first terminal and the second terminal, if a state of charge (SOC) difference between the first battery pack and the second battery pack at a second time point after the first time point in the first charging cycle with the first switch turned on and the second switch off,
   wherein each of a SOC of the first battery pack and a SOC of the second battery pack is determined based on a voltage and a current of a corresponding one of the first and second battery packs using ampere counting, an equivalent circuit model, or a Kalman filter.

15. The battery control method according to claim 14, further comprising:
   determining the first threshold voltage based on a state of health (SOH) of the first battery pack and a SOH of the second battery pack.

16. The battery control method according to claim 14, further comprising:
   transmitting a second command to the power conversion system to induce the power conversion system to supply a second constant power between the first terminal and the second terminal, if the SOC difference between the first battery pack and the second battery pack is less than the threshold SOC at the second time point or a third time point after the second time point in the first charging cycle with the first switch turned on and the second switch off,
   wherein the second constant power is smaller than the first constant power.

17. The battery control method according to claim 16, further comprising:
   turning on the second switch to connect the first battery pack and the second battery pack in parallel, if:
      the voltage of the first battery pack is equal to or higher than the voltage of the second battery pack at a fourth time point after the third time point in the first charging cycle, and
      the voltage difference between the first battery pack and the second battery pack is smaller than a second threshold voltage.

18. The battery control method according to claim 17, further comprising:
   transmitting the second command to the power conversion system, if the voltage of the first battery pack is lower than the voltage of the second battery pack at the fourth time point.

19. The battery control method according to claim 17, further comprising:
   transmitting a third command to the power conversion system to induce the power conversion system to stop supplying the second constant power, if the voltage of the first battery pack is higher than the voltage of the second battery pack by the second threshold voltage or more at the fourth time point.

20. The battery control method according to claim 19, further comprising:
   turning on the second switch to connect the first battery pack and the second battery pack in parallel, if the voltage difference between the first battery pack and the second battery pack is smaller than the first threshold voltage at a fifth time point in the first charging cycle,
   wherein the fifth time point is a time point at which a stabilization period has passed from a time point at which the power conversion system stopped supplying the second constant power in response to the third command.

* * * * *